(12) United States Patent
Boutnaru (10) Patent No.: US 10,909,077 B2
(45) Date of Patent: Feb. 2, 2021

(54) FILE SLACK LEVERAGING

(71) Applicant: PAYPAL, INC., San Jose, CA (US)

(72) Inventor: Shlomi Boutnaru, Modiin (IL)

(73) Assignee: PayPal, Inc., San Jose, CA (US)

( * ) Notice: Subject to any disclaimer, the term of this patent is extended or adjusted under 35 U.S.C. 154(b) by 323 days.

(21) Appl. No.: 15/280,968

(22) Filed: Sep. 29, 2016

(65) Prior Publication Data

US 2018/0089216 A1    Mar. 29, 2018

(51) Int. Cl.
*G06F 16/17*    (2019.01)
*G06F 8/61*    (2018.01)

(52) U.S. Cl.
CPC ............ *G06F 16/1727* (2019.01); *G06F 8/61* (2013.01); *G06F 16/1734* (2019.01)

(58) Field of Classification Search
CPC ................. G06F 17/30138; G06F 8/61; G06F 17/30144; G06F 17/30091; G06F 17/30864
USPC .......................................................... 707/822
See application file for complete search history.

(56) References Cited

U.S. PATENT DOCUMENTS

| | | | | |
|---|---|---|---|---|
| 2004/0128470 A1* | 7/2004 | Hetzler | ............... | G06F 12/0804 711/209 |
| 2008/0235355 A1* | 9/2008 | Spanier | ................. | G01D 4/004 709/219 |
| 2008/0263371 A1* | 10/2008 | Weissman | ............. | G06F 21/575 713/193 |
| 2009/0138453 A1* | 5/2009 | Jee | .......................... | G06F 16/10 |
| 2012/0047189 A1* | 2/2012 | Staffer | .............. | G06F 17/30138 707/830 |
| 2012/0131309 A1* | 5/2012 | Johnson | ..................... | G06F 9/30 712/41 |
| 2012/0239896 A1* | 9/2012 | Sobel | ..................... | G06F 3/0608 711/165 |
| 2014/0101373 A1* | 4/2014 | Lee | ....................... | G06F 3/0655 711/103 |
| 2014/0372742 A1* | 12/2014 | Hayakawa | .............. | G06F 9/441 713/2 |
| 2016/0188462 A1* | 6/2016 | Shin | .................... | G06F 12/0269 707/820 |

\* cited by examiner

*Primary Examiner* — Hosain T Alam
*Assistant Examiner* — Nicholas E Allen
(74) *Attorney, Agent, or Firm* — Haynes and Boone LLP (57) ABSTRACT

A system and method for utilizing slack space as another file system. The system identifies available slack space caused by storing data on a drive. The slack space is then made available as part of a separate file system. The separate file system allows for dynamic cluster sizes as the cluster size depends on the slack space of each individual file. The available space for the file system also dynamically changes based on the change in slack space caused by new data files being stored on the drive, edits to data files on the drive, or deletion of data files.

20 Claims, 5 Drawing Sheets

```
301
┌─────────────────────┐
│ Monitor For New Files│
│ Stored On Drive With │
│Partitioned Slack Space│
└─────────────────────┘
          │
          ▼
       302
    ◇ New Slack Space? ◇
          │
          ▼
       303                    305
    ◇ Known File ◇──N──▶ Monitor File Space Usage
    ◇ Permanency? ◇                │
          │Y                      306
   304    ▼                        ▼
 Rank Slack Space Based    Rank Slack Space Based
    On File Type                  Usage
          │                        │
          └────────┬───────────────┘
                   ▼
                307
        Determine Availability Of
               Slack Space
                   │
                  308
                   ▼
            Make Slack Space
               Available
```

FILE SLACK LEVERAGING

TECHNICAL FIELD

The present disclosure relates to increasing data storage efficiency, and more specifically increasing efficiency by utilizing slack space.

BACKGROUND

Typically, systems store data on a memory device based on whole clusters, blocks, and/or the like (collectively referred to as cluster) units due to how file systems are configured. Storing data on memory devices using cluster units often results in slack space on at least one of the clusters that the data is stored on. That slack space is often unused and wasted. It would be beneficial if there were a way to utilize the slack space.

The detailed description that follows provides several embodiments and advantages of the system of the present disclosure. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. However, persons skilled in the art would recognize that they may practice some embodiments without some or all of these specific details. The particular embodiments disclosed herein are meant to be illustrative but not limiting. One skilled in the art may realize other elements that, although not specifically described here, are within the scope and the spirit of this disclosure. Also, to avoid unnecessary repetition, one or more features shown and described in association with one embodiment may be incorporated into other embodiments unless expressly described otherwise or if the one or more features would make an embodiment non-functional.

Some embodiments of the present disclosure provide a way to repurpose slack space. In some examples, a system configures a slack space monitor to monitor slack space created when a file is stored on a data drive. The system may also create an address table maintaining memory address pointers pointing to the location of the slack space cluster. The table may also include information about the size of the slack space for the system to determine how much slack space exists and prevents the system from overwriting passed the slack space. In some examples, the system may monitor a file associated with some slack space to determine the stability of the slack space. The system may store critical files in more stable slack space while use unstable slack space for temporary storage or critical data. The system may also manage the slack space when an associated data file is edited or deleted.

In some embodiments, the present disclosure provides a way of implementing a secondary operating system within slack space created from a primary operating system. In some examples, the system may store the critical files of the secondary operating system in the slack space of critical files associated with the primary operating system. The operation system may maintain an address table for indicating which clusters (or blocks) of a data drive is in use, has available slack space, the amount of the available slack space, and/or what data is held in the available slack space. The system may also separate the availability of the data drive depending on whether it is slack space or not. For example, an unused cluster may be available to the primary cluster while the slack space of a used cluster may be available to the secondary operation system.

Figure 1:
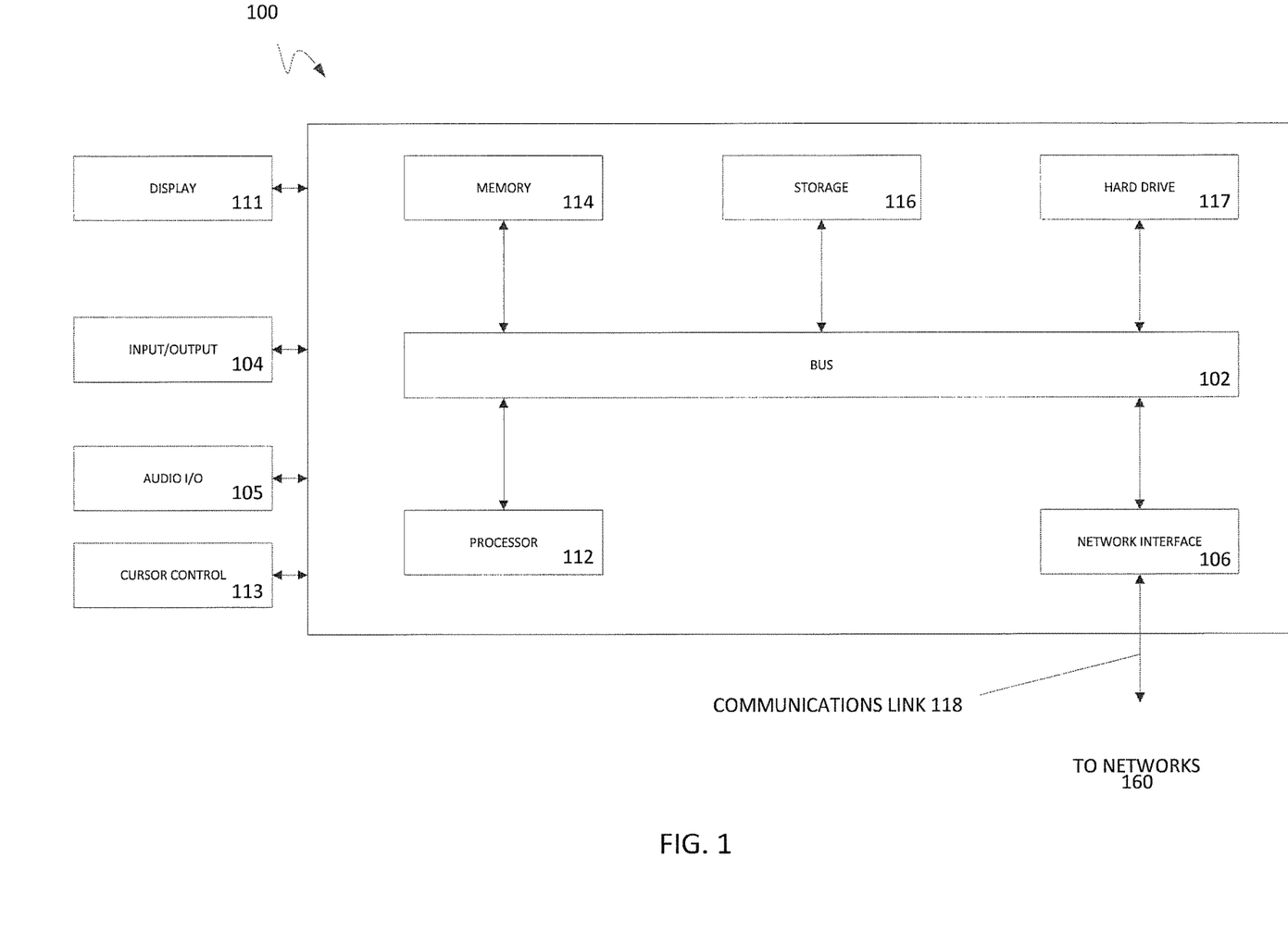
FIG. 1 is a block diagram of an example computer system suitable for implementing one or more slack space management operations.

FIG. 1 illustrates, in block diagram format, an example embodiment of a computing system adapted for implementing one or more embodiments disclosed herein for slack space management. In some examples, computing system 100 may be implemented in conjunction with a plurality of servers, devices, and/or software components that operate to perform various methodologies and/or operations in accordance with the described embodiments. It may be appreciated that the system illustrated in FIG. 1 may be deployed in other ways and that the operations performed by the system may be distributed, and/or separated for a given implementation.

Computing system 100 may comprise, take the form of, and/or employ one or more devices such as a laptop, a mobile computing device, a tablet, a PC (e.g., a smart or mobile phone, a computing tablet, laptop, wearable device, PDA, etc.), and/or any other computing device having computing capabilities in accordance with the described embodiments. Computing system 100 may include a cellular telephone, smart phone, electronic wearable device (e.g., smart watch, virtual reality headset), or other similar devices that a user may carry on or about his or her person and access readily. Additionally, as more and more devices become sophisticated or computerized, such as new smart devices, these devices may be part of computer system 100.

Computer system 100 may include a bus 102 or other communication mechanisms for communicating information data, signals, and information between various components of computer system 100. Components include an input/output (I/O) component 104 that processes a user action, such as selecting keys from a keypad/keyboard, selecting one or more buttons, links, actuatable elements, etc., and sends a corresponding signal to bus 102. I/O component 104 may also include an output component, such as a display 111 and a cursor control 113 (such as a keyboard, keypad, mouse, touchscreen, etc.). In some examples, I/O component 104 may include an image sensor for capturing images and/or video, such as a complementary metal-oxide-semiconductor (CMOS) image sensor, and/or the like. An audio input/output component 105 may also be included to allow a user to use voice for inputting information by converting audio signals. Audio I/O component 105 may allow the user to hear audio. A transceiver or network interface 106 transmits and receives signals between computer system 100 and other devices, such as another user device, an Internet service provider, an email server, application service provider, web server, and/or other servers via a network. In various embodiments, such as for many cellular telephones and other mobile device embodiments, this transmission may be wireless, although other transmission mediums and methods may also be suitable.

As shown, system 100 may communicatively couple to one or more networks 160. Networks 160 may include one or more different networks such as the Internet, a WAN, a WWAN, a WLAN, a mobile telephone network, a landline telephone network, personal area network, as well as other suitable networks. In some examples, system 100 may communicate with other devices connected to networks 160 by sending and or receiving information via one or more communication protocols such as HTTP, TCP, UDP, and/or the like. In some examples, communications may be through interaction with a website, e-mail, IM session, VPN, and/or the like. Any of a wide variety of suitable communication types, including wireless and/or wired communications types, between system 100 and other devices may take place, as will be readily appreciated.

A processor 112, which may be a micro-controller, digital signal processor (DSP), or another processing component, processes these various signals, such as for display on computer system 100 or transmission to other devices over a network 160 via a communication link 118. Again, communication link 118 may be a wireless communication in some embodiments. Processor 112 may also control transmission of information, such as cookies, IP addresses, images, and/or the like to other devices.

Components of computer system 100 may also include a system memory component 114 (e.g., RAM), a static storage component 116 (e.g., ROM), and/or a disk drive 117. Computer system 100 performs specific operations by processor 112 and other components by executing one or more sequences of instructions contained in system memory component 114. Logic may be encoded in a computer-readable medium, which may refer to any medium that participates in providing instructions to processor 112 for execution. Such a medium may take many forms, including but not limited to, non-volatile media, volatile media, and/or transmission media. In various implementations, non-volatile media includes optical or magnetic disks, volatile media includes dynamic memory such as system memory component 114, and transmission media includes coaxial cables, copper wire, and fiber optics, including wires that comprise bus 102. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

Computer system 100 may employ one or more programs, such as system programs and application programs to perform various computing and/or communications operations. Example system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below. For example, one of the applications may be a slack space manager that monitors data stored on a hard disk and the slack space associated with the data, as discussed below.

In various embodiments of the present disclosure, execution of instruction sequences to practice the present disclosure may be performed by computer system 100. In various other embodiments of the present disclosure, a plurality of computer systems 100 coupled by communication link 118 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other volatile or non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. Also, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used in one or more devices including system 100. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 2:
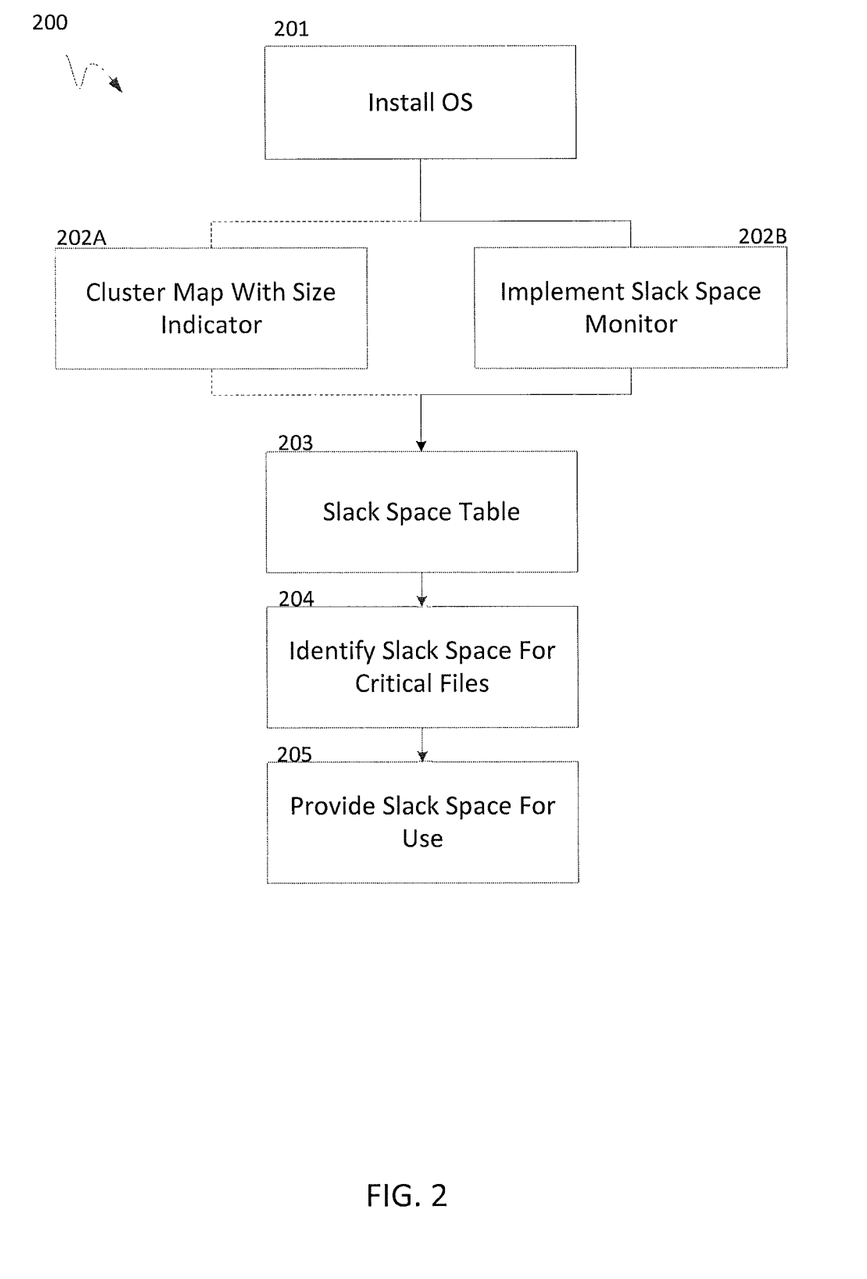
FIG. 2 is a flow diagram illustrating an example process for implementing an operating system that provides slack space use allocation.

FIG. 2 illustrates an example process 200 for implementing an operating system that provides slack space use allocation. In some examples, process 200 may be implemented on a computing device, such as computer system 100 of FIG. 1. In some examples, process 200 may include operation 201. At operation 201 the system may install an operating system, which may be in response to a user input. For example, a user may provide the operating system for installation to the system through a memory device. In some examples, the operating system may be configured to allocate slack space for storing data. In some embodiments, a software slack space manager may be installed to monitor and manage the slack space for allocation and use as free data space.

In some examples, process 200 may include operation 202A. At operation 202A, the system may set up a cluster map or cluster table with a cluster size indicator. In some examples, the operating system may modify a standard cluster map or cluster table, such as the File Allocation Table (FAT)/NTFS (New Technology File System)/any other file system, to have a cluster size indicator. In some embodiments, the cluster size indicator may simply indicate whether the entire cluster is in use or not. In some cases, to save data space, the system may indicate whether a stored data file has available slack space associated with it. In this manner, rather than indicating whether each cluster that a file occupies has slack space, the system can use a single indicator for the all of the clusters occupied by the data file indicating whether the last cluster that the file occupies has available slack space. Typically, a file does not correspond with more than one cluster with slack space. As such, the system would be able to use the indicator to determine the available slack space. The system would be able to check the size of a file associated with a cluster in comparison to the size on disk, and the size difference would be the available slack space on the associated cluster. For example, a file may be one byte but take 4 kilobytes on disk. The slack space of that file would be 3,999 bytes (4000 bytes-1 byte). Additionally, this would allow for the file system of the slack space to be the same format as the file system used with the operating system installed at operation 201. Although, in some embodiments, different file systems may be used.

In some examples, process 200 may include operation 202B. At operation 202B the system may implement a slack space monitor for tracking and keeping a record of the available slack space and/or cluster space. The monitor may track files that are stored on a long-term storage device, such as a hard drive. The monitor may determine the available slack space based on the size of the file in relation to a whole number multiple of clusters to hold the file. In some examples, the monitor may also determine the address of the cluster that has available slack space and/or the location of a sector wherein the slack space begins and/or ends. In some examples, the operations of the slack space monitor implemented in operation 202B may be integrated with or replace operation 202A for determining slack space availability. In some examples, the slack space monitor may be associated with a separate or secondary operating system that will use the slack space. In some examples the slack space may be reserved for use by the secondary operating system while the rest of the drive space is allocated to the operating system installed at operation 201 (referenced as the main or primate operating system) and/or another operating system. In some examples, to prevent overwriting information on the slack space, the system may update the space availability of a cluster when data is stored in the slack space.

In some examples, process 200 may include operation 203. At operation 203, the system may maintain and/or create a slack space table for storing information about the available slack space. In some examples, the slack space table may be part of a file system or cluster map for a secondary or separate operating system. The system may use the slack space table to record the location and/or address of a cluster with the available slack space. In some examples, the slack space table may be a cluster map similar to other cluster maps (used in different file systems e.g. FAT, FAT32, NTFS, Ext4, HFS, etc.) that maps the available slack space and/or used slack space. The slack space table may allow for a dynamic cluster size for each cluster in the cluster map. In this manner, the cluster size may dynamically change because the cluster size depends on the slack space, which depends on a size of files stored on the disk. The slack space table may have data fields to store information regarding the available size for each cluster that a file maps to and which sectors are free. A sector may be a subdivision of a memory device that is the size of a minimum storage unit for the memory device. In some examples, the slack table may store a record of the address of the first free sector of the cluster, the available number of sectors for use, the available size of the cluster, and/or the last sector address for the corresponding cluster. In some examples, the slack table may be shared by multiple operating systems.

In some examples, process 200 may include operation 204. At operation 204 the system may determine the slack space for files of the operating system installed at operation 201. In some examples, the system may ignore slack space for certain files or rank slack space based on file stability or permanence. For example, a file related to a log, which would likely change regularly, may be marked as less permanent or more unstable slack space. Files that change frequently, are regularly edited, or are temporary may have a relatively unpredictable slack space. As such, the system may rank the file with low stability. As another example, a critical kernel file or executable file is rarely changed or updated. Slack space associated with such a file may be marked as stable or permanent. In this manner, the system may determine, based on the stability ranking and/or indicators, how the slack space is used by the system. For example, the system may use some slack space (e.g. higher ranked or more permanent slack space) for more permanent storage, such as other critical files, while other slack space (e.g. lower ranked or less permanent slack space) may be ignored/unused or used for temporary storage, such as for storing temporary document files used by Word®. In some examples, the system may reduce the file cluster size when the slack space is used, such that the file on the file system of the primary operating system or the file system associated with the cluster space begins writing new data on a new cluster rather than overwriting the slack space data.

In some examples, the critical files that are stable with the operating installed at operation 201 may be saved for storing or use of critical files associated with a secondary operating system that is going to be held on the free slack space.

In some examples, process 200 may include operation 205. At operation 205, the system may present the slack space as a separate drive partition for holding data. As the slack space is used, the system may update the availability of a cluster associated with the slack space. For example, the slack space of the cluster may be marked as used in a cluster table. A user may use the system to store data or even another operating system in the slack space. In some examples, the system may implement one or more of the processes discussed below for managing data for storage in the slack space.

Figure 3:
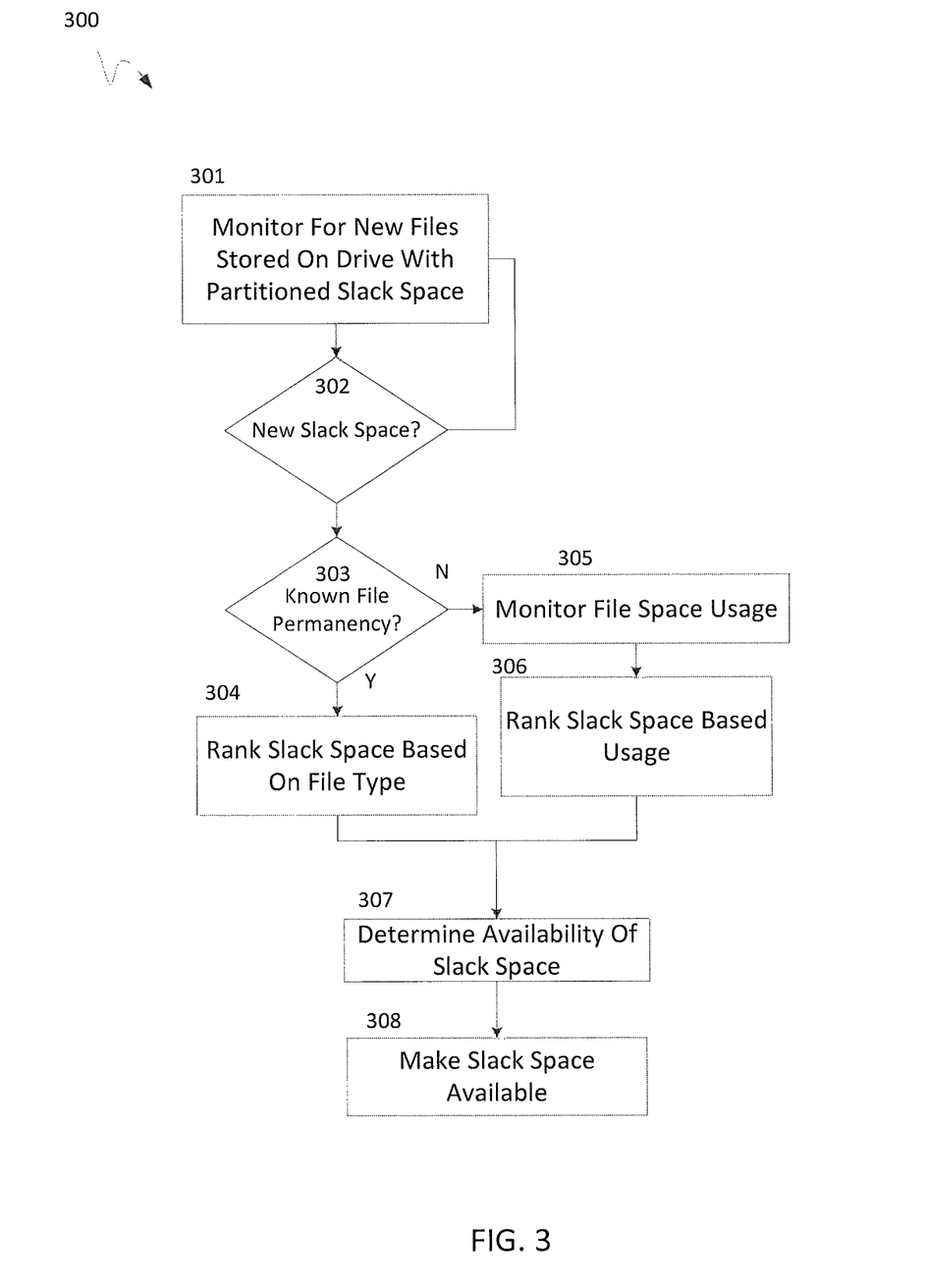
FIG. 3 is a flow diagram illustrating an example process for increasing the slack space availability as a file is saved on a drive configured to utilize slack space.

FIG. 3 illustrates an example process 300 for increasing the slack space availability as a file is saved on a drive configured to utilize slack space. In some examples, process 300 may be implemented along with other processes discussed herein, such as process 200 of FIG. 2 and/or on a computing device, such as computer system 100 of FIG. 1.

As a user stores an additional file on a system drive with the main file system or main drive partition associated with a slack space file system or slack space partition, additional slack space will be created on the slack space partition, except for when the cluster size is a factor of the size of the additional file. This allows for the capability of an associated slack space partition size to grow as additional files are stored on the drive. Process 300 may allow for the tracking and managing of the additional slack space.

In some examples, process 300 may include operation 301. At operation 301, the system may monitor and determine when a new file is stored on the main file system of the drive, rather than on the slack space of the drive. In response to a new file being stored on the main file system, the system may determine whether the new files create slack space and how much slack space is created. As discussed above, the system may determine whether a file has a corresponding slack space and/or the size of the slack space based on the difference between the size of the file and the size of the file on disk. In some examples, the system may be able to determine information about the slack space based on the file size and cluster size.

At process 302, the system may return to monitoring for additional files at operation 301 in response to determining that the storing of the new file did not create additional slack space. On the other hand, the system may continue to format slack space for use in response to determining that the new file creates additional slack pace.

In some examples, process 300 may include operations 303-306 for determining or ranking the permanency of the new slack space. Process 300 may include operation 303 wherein the system may attempt to determine the permanence of the file based on the file type.

In some examples, the system may have a table of file types or information about certain files with a predetermined permanence category and/or ranking. For example, executable files, library files, PDF files, media files (e.g. .mov, .jpeg, .mp3, etc.), and/or the like may be categorized and/or ranked with a high permanence level. On the other hand, log files and/or other files that are regularly edited may be categorized and/or ranked with a lower permanence level.

In some example, the system may account for file attributes, such as whether the file is read-only and/or the last time the file was edited. A read-only file may indicate that the file is more likely to remain unchanged while a recent edit to the file may indicate the file is more likely to change. In some examples, the system may account for the type of application the file is associated with. For example, files associated with an operating system are less likely to be deleted than images unassociated with an application. Similarly, critical operating system files are unlikely to be deleted.

In some examples, if the system can determine the permanence of the file based on the file type and/or attributes, the system may continue to operation 304 and rank or categorize the slack space accordingly.

In some examples, if the system cannot determine the permanence of the file based on the file type and/or attributes, the system may monitor the file for changes to the file at operation 305. In some examples, the system may monitor the file for a predetermined amount of time, clock cycles, and/or the like. In some examples, the system may monitor the file for a number of times that an application associated with the file is executed. The system may monitor the file to determine how often it is edited, how often the file size changes, how much the file size changes, and/or the like.

In some examples, at operation 306, the system may determine a permanency rank and/or category for the file based on the monitoring of the file for the predetermined amount of time, clock cycles, executions, etc. at operation 305. In some examples, the system may use the determined rank at operation 306 for future files of the same type at operation 304 and update the table used at operation 303 accordingly. In this manner, the system may reduce lag time between new slack space being created and when the new slack space is made available for use.

In some examples, process 300 may include operation 307. At operation 307, the system may determine how the slack space is used, how much of the slack space can be used, and/or whether the slack space can be used at all. For example, the system may determine that the file type and/or the specific file is highly unstable at operation 304 and/or 306. In such examples, the system may designate the slack space to stay unused or used temporarily similar to volatile memory. For example, the system may treat slack space categorized as unstable as if the data in the slack space will be deleted regularly and/or upon resetting of the system. In some examples, the system may prevent critical files from being stored in the slack space categorized as unstable. In this manner, critical data is not lost.

In some examples, the system may determine that the file is highly stable. In such examples, the system may allow for the entire slack space to be used without restriction. In some examples, the system may determine that the space is somewhere between stable and unstable, such as moderately stable. In such an example, the system may group the slack space with other moderately stable slack space for keeping redundancies. In this manner, the moderately stable slack space, when grouped with other moderately stable slack space, can be treated similarly to a highly stable slack space. For example, some or all of the information stored on the moderately stable slack space may be duplicated mirrored on one or more other moderately stable slack spaces such that if the data in the moderately stable slack space is used or overwritten by a file, the information in the moderately stable slack space can be recreated. In some examples, the information may be mirrored to create redundancy. In some examples, the system may implement distributed parity for redundancy. In some examples, the level of redundancy and/or the number of mirrored copies of information may depend on the determined slack space stability. For example, the system may use more redundancies for a first slack space cluster that is less stable than a second slack space cluster. Additionally, the system may determine the size availability of the slack space. In some examples, if there are no other moderately stable slack spaces mirroring data with a newly created moderately stable slack space, the system may not make the newly created moderately stable slack space available. On the other hand if there are one or more other moderately stable slack spaces to mirror data with the newly created moderately stable slack space, the system may determine an appropriate slack space size to make available. For example, the system may determine the smallest slack space size among the newly created moderately stable slack space and the one or more other moderately stable slack spaces. The system may designate the determined smallest slack space size as the appropriate slack space size to make available in order to ensure that there is enough slack space for storing redundancies among the newly created moderately stable slack space and the one or more other moderately stable slack spaces.

In some examples, the system may include operation 308. At operation 308, the system may make the slack space available for use. The system may also update the size or available slack space for the partition associated with the slack space.

Figure 4:
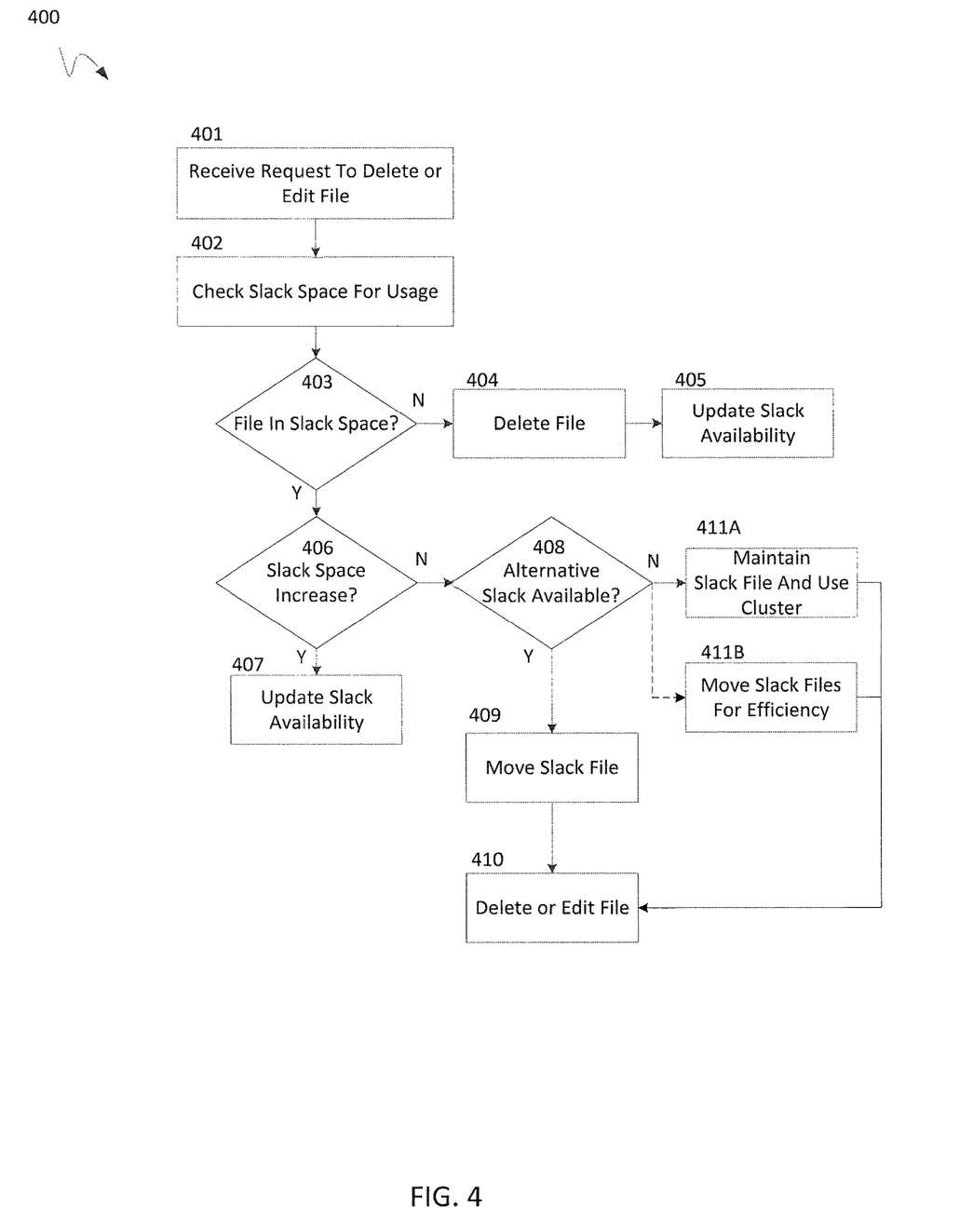
FIG. 4 is a flow diagram illustrating an example process for managing slack space in response to a file associated with slack space is deleted or edited.

FIG. 4 illustrates an example process 400 for managing slack space in response to a file associated with, causing, and/or creating slack space is deleted or edited. In some examples, process 400 may be implemented along with other processes discussed herein, such as process 200 of FIG. 2 and/or on a computing device, such as computer system 100 of FIG. 1.

At operation 401, the system may receive a request to delete or edit a file that is associated with, causes, and/or creates slack space on a data storage drive. As discussed above, slack space can be created when a data file has a size that is not a whole multiple of a cluster size. At some point that file may be deleted or the size of the file may change.

In some examples, in response to receiving the request at operation 401, the system may check the slack space to determine if a file is being held in the slack space at operation 402. In some examples, the system may check a cluster map or a file table that provides an indication as to whether the slack space is being used or not.

At operation 403, if the system determines that the slack space is not being utilized, the system may continue to operation 404. If, at operation 403, the system determines that there is a file held in the slack space, the system may continue to operation 406.

At operation 404, the system may continue to delete or edit the file as requested in operation 401. Additionally, the system may determine the change in the slack space due to the deletion or edit. For example, when a file is deleted, the slack space associated with the file would no longer exist. As such, the system may remove the availability of that slack space. In the example where the file is edited, the file may use more or less of a remaining cluster space, which will affect the available slack space. In some examples, the system may use less of the remaining cluster due to a file edit, which may increase the available slack space associated with the file. In other examples, the file edit may cause the system to use more of a cluster and have less available slack space.

In some examples, the system may include operation 405. At operation 405 the system may update the available slack space. In some examples, such as in response to a file being deleted, the available slack space may decrease. In such an example, the system may reduce the total slack space availability by the size of the slack space removed due to deleting the file. Furthermore, the system may update a cluster map or file system table removing the slack space from availability.

In some examples, the slack space may not be removed, but instead the size of the slack space may change due to a file edit. In such an example, the system may update the cluster map and/or file table changing the size of the slack space accordingly.

At operation 406, the system may determine whether the request at operation 401 causes the slack space to increase. For example, the request at operation 401 may cause the file to take up less space and increase slack space. If the slack space increase, the system may continue to operation 407. At operation 407 the system may update the slack space availability. In some examples, the system may also rewrite the file held in the slack space to ensure that the slack space is used efficiently. For example, a file held in slack space may use several slack spaces in conjunction (e.g. each slack space may be used as a cluster) to maintain the entire file. To prevent slack in the slack space usage, the system may rearrange how the data is held on the multiple slack spaces to prevent slack on multiple slack space clusters.

If the slack space decreases below the size of the file held on the slack space or if the file is deleted, the system may continue to operation 408. At operation 408, the system may search for an alternate available slack space such that the file can be moved to the alternate space. If the system determines that there is available slack space, the system may continue to operation 409. At operation 409, the system may move the file from the slack space associated with the file to be edited or deleted to the available slack space, update memory address pointer locations associated with the file in the slack space, and then continue to operation 410 wherein the system may delete or edit the file requested at operation 401.

If, at operation 408, the system determines that slack space is not available, the system may continue to operation 411A or 411B. In some examples, the system may perform operation 411A and maintain the slack file on the cluster that the slack file is stored on or move the slack file to a new unused cluster. The system may ensure than the cluster maps or file system tables for the main partition of the data drive and the slack space partition indicate that the cluster is in use so that the file is not accidentally overwritten by the system. Additionally, the rest of the corresponding cluster may be used as additional slack space as well. The system may update the cluster map or file system table for the slack space partition for the additional slack space. The system may then continue to operation 410 and delete or edit the file.

Alternatively, the system may move slack files around to more efficiently use slack space to create a slack space for the slack file and store the slack file in the newly created slack space. The system may update pointers for the location of the moved file and then continue to operation 410 and delete or edit the file as requested at operation 401. In some examples, read efficiency of data held in slack space may be important. As such, the system be configured to have files that span multiple slack spaces be held in nearby clusters or the nearest clusters on the drive.

Figure 5:
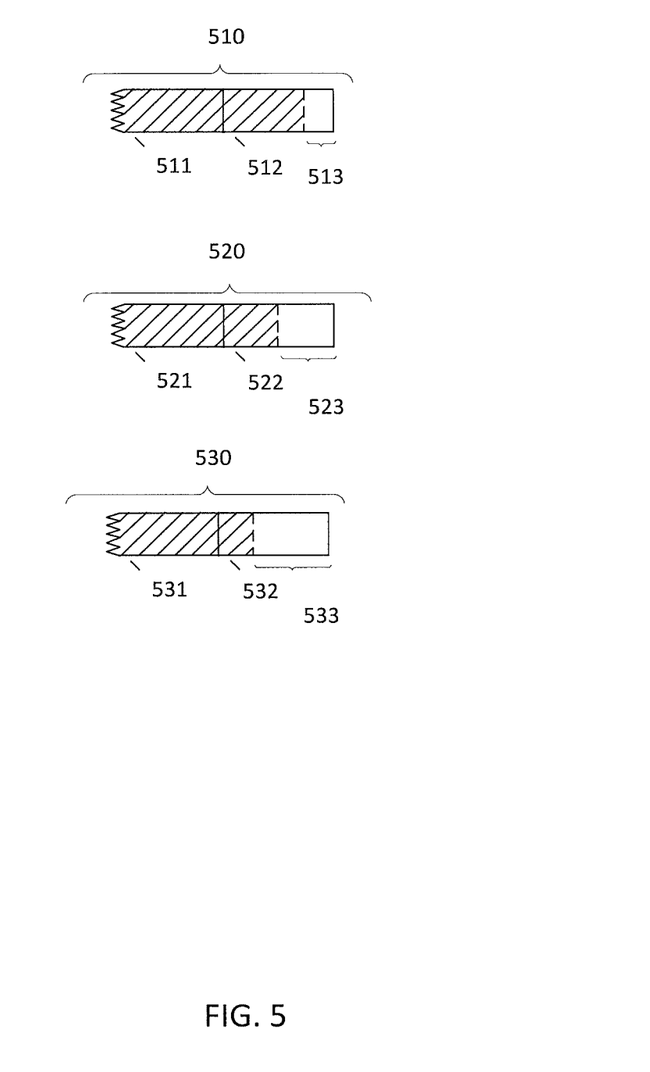
FIG. 5 illustrates an example block diagram illustrating how a file system may organize slack space of a drive as a separate partition.

FIG. 5 is an example block diagram illustrating how a file system may organize slack space of a drive as a separate partition. References 510, 520, and 530 depict data for separate files held on a drive. File 510 may occupy, in addition to other data clusters, clusters 511 and 512. As shown, file 510 does not use up all of cluster 512 and therefor has slack space 513.

Similarly, a portion of file 520 is shown occupying, in addition to other data clusters, clusters 521 and 522 which may be on the normal file system or partition. The normal file system or partition may be the primary or main file system or partition, which may be the file system or partition that causes the creation of slack space when a file is saved on the normal file system or partition. The normal file system Furthermore, cluster 522 has slack space 523. Additionally, a portion of file 530 is shown occupying, in addition to other data clusters, clusters 531 and 532. Cluster 532 has slack space 533. As can be seen in FIG. 5, slack space 513, 523, and 533 are different sizes. In some examples, such as with process 200 each of slack space 513, 523, and 533 may each be a cluster of free space as a slack space partition. In some examples a file data may occupy one or more of slack space 513, 523, and 533 together. In this manner, a system that implements slack space as a partitioned data drive may have dynamic cluster sizes and use the free space for storing additional flies rather than wasting the slack space. In some examples, slack space 513, 523, and/or 533 may form clusters used for another operating system that may be a secondary or separate operating system from the operating system that is associated with data in clusters 511, 521, and 531.

The preceding disclosure is not intended to limit the present disclosure to the precise forms or particular fields of use disclosed. As such, it is contemplated that various alternate embodiments and/or modifications of the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory; and
    one or more hardware processors coupled to the non-transitory memory and configured to read instructions from the non-transitory memory to cause the system to perform operations comprising:
        determining a first cluster size used for a first operating system installation, wherein the first cluster size is a unit for dividing memory in a hardware memory device into clusters for the first operating system installation;
        identifying a plurality of clusters within the hardware memory device allocated to the first operating system installation and partially occupied by data that is associated with the first operating system installation and that is stored in the plurality of clusters;
        determining, for each cluster in the plurality of clusters, a stability of data stored in the cluster based at least in part on a data type associated with the data stored in the cluster for the first operating system installation;
        ranking the plurality of clusters based on the stability determined for each cluster in the plurality of clusters;
        determining, from the plurality of clusters, a first cluster for a second operating system installation based on the ranking of the plurality of clusters;
        determining an available space in the first cluster based on the first cluster size and a size of first data associated with a first data file stored in the first cluster by the first operating system installation; and
        writing, for the second operating system installation, second data associated with a second data file in the available space in the first cluster.

2. The system of claim 1, wherein the operations further comprise recording, for the second data file, a memory address pointer indicating a location in the first cluster where the second data begins.

3. The system of claim 2, wherein the memory address pointer is recorded in a file system that is used by the first operating system installation and the second operating system installation.

4. The system of claim 1, wherein the first operating system installation has access to a second cluster on the hardware memory device that is not shared with the second operating system installation and the second operating system installation has access to a third cluster on the hardware memory device that is not shared with the first operating system installation.

5. The system of claim 2, wherein the memory address pointer is stored in a table maintained by a file system.

6. The system of claim 1, wherein the operations further comprise changing an available size of the first cluster available to the first operating system installation in response to writing the second data in the first cluster for the second operating system installation.

7. The system of claim 1, wherein the operations further comprise:
    determining a criticality of the second data based on a data type of the second data file, wherein the first cluster is determined further based on the criticality of the second data.

8. The system of claim 1, wherein the operations further comprise compiling available spaces in the plurality of clusters as a memory partition for the second operating system installation.

9. A non-transitory machine-readable medium having stored thereon machine-readable instructions executable to cause a machine to perform operations comprising:
    identifying a plurality of slack spaces on a hardware memory device, wherein each slack space in the plurality of slack spaces corresponds to an unused space within a cluster that is allocated to a first operating system installation and that is partially occupied by data associated with the first operating system installation;
    determining, for each slack space in the plurality of slack spaces, a stability based at least in part on a data type associated with data stored in a corresponding cluster for the first operating system installation;
    ranking the plurality of slack spaces based on the stability determined for each slack space in the plurality of slack space;
    determining, from the plurality of slack spaces, a first slack space in a first cluster for a second operating system installation based on the ranking of the plurality of slack spaces;
    determining a size of the first slack space in the first cluster based on a cluster size and a size of first data associated with a first data file stored in the first cluster by the first operating system installation; and
    writing, for a second operating system installation, second data associated with a second data file in the first slack space in the first cluster.

10. The non-transitory machine-readable medium of claim 9, wherein the operations further comprise recording, for the second data file, a memory address pointer indicating a location of the first slack space on the first cluster where the second data is stored.

11. The non-transitory machine-readable medium of claim 9, wherein the first operating system installation and the second operating system installation share a file system for managing storage space on the hardware memory device.

12. The non-transitory machine-readable medium of claim 9, wherein the first operating system installation has access to a second cluster on the hardware memory device that is not shared with the second operating system installation and the second operating system installation has access to a third cluster on the hardware memory device that is not shared with the first operating system.

13. The non-transitory machine-readable medium of claim 10, wherein the memory address pointer is stored in a table maintained by a file system.

14. The non-transitory machine-readable medium of claim 9, wherein the operations further comprise changing an available size of the first cluster available to the first operating system installation in response to writing the second data on the first slack space of the first cluster for the second operating system installation.

15. The non-transitory machine-readable medium of claim 9, wherein the operations further comprise compiling the plurality of slack spaces as a memory partition for the second operating system installation.

16. A computer implemented method comprising:
    identifying, by the one or more hardware processors, a plurality of clusters within a hardware memory device that is allocated to a first operating system installation and that is partially occupied by data associated with the first operating system installation;
    determining, for each cluster in the plurality of clusters, a stability based at least in part on a data type associated with data stored in the cluster for the first operating system installation;
    ranking the plurality of clusters based on the stability determined for each cluster in the plurality of clusters;
    determining, by the one or more hardware processors from the plurality of clusters, a first cluster for data storage for a second operating system installation based on the ranking of the plurality of clusters;
    determining, by the one or more hardware processors, an available space in the first cluster based on a cluster size and a size of first data associated with a first data file stored in the first cluster for the first operating system installation; and
    writing, by the one or more hardware processors for a second operating system installation, second data associated with a second data file in the available space in the first cluster.

17. The computer-implemented method of claim 16, further comprising recording, for the second data file, a memory address pointer indicating a location in the first cluster where the second data is stored.

18. The computer-implemented method of claim 17, wherein the memory address pointer is stored in a table maintained by a file system.

19. The computer-implemented method of claim 16, wherein the first operating system installation has access to a second cluster on the hardware memory device that is not shared with the second operating system installation and the second operating system installation has access to a third cluster on the hardware memory device that is not shared with the first operating system installation.

20. The computer-implemented method of claim 16, further comprising:
    determining a criticality of the second data based on a data type of the second data file, wherein the first cluster is determined further based on the criticality of the second data.

* * * * *